United States Patent
Dournov et al.

(10) Patent No.: US 7,383,161 B2
(45) Date of Patent: Jun. 3, 2008

(54) SYSTEMS AND METHODS FOR DEVICE SIMULATION

(75) Inventors: Pavel A Dournov, Redmond, WA (US); John M Oslake, Seattle, WA (US); Efstathios Papaefstathiou, Redmond, WA (US); Glenn R. Peterson, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 419 days.

(21) Appl. No.: 11/105,251

(22) Filed: Apr. 13, 2005

(65) Prior Publication Data

US 2006/0248510 A1    Nov. 2, 2006

(51) Int. Cl.
G06F 17/50    (2006.01)
G06F 9/45     (2006.01)

(52) U.S. Cl. .................... 703/2; 703/22; 718/104
(58) Field of Classification Search ............. 703/2, 703/22; 718/104
See application file for complete search history.

(56) References Cited

U.S. PATENT DOCUMENTS

| | | | |
|---|---|---|---|
| 4,631,363 A * | 12/1986 | Foster et al. ............. 379/15.01 |
| 5,388,196 A | 2/1995 | Pajak et al. | |
| 5,838,319 A | 11/1998 | Guzak et al. | |
| 5,920,700 A | 7/1999 | Gordon et al. | |
| 5,953,724 A | 9/1999 | Lowry | |
| 5,978,576 A * | 11/1999 | Sanadidi et al. ............... 703/22 |
| 6,192,470 B1 | 2/2001 | Kelley et al. | |
| 6,496,842 B1 | 12/2002 | Lyness | |
| 7,096,178 B2 * | 8/2006 | Gluhovsky ................... 703/22 |
| 7,149,731 B2 | 12/2006 | Dettinger et al. | |
| 2002/0176075 A1 | 11/2002 | Emerick et al. | |
| 2003/0046396 A1 | 3/2003 | Richter et al. | |
| 2003/0163298 A1 | 8/2003 | Odom et al. | |
| 2003/0167381 A1 | 9/2003 | Herscovich et al. | |
| 2003/0176993 A1 | 9/2003 | Lines et al. | |
| 2004/0049372 A1 | 3/2004 | Keller | |
| 2004/0107219 A1 | 6/2004 | Rosenberger | |
| 2004/0181794 A1 * | 9/2004 | Coleman et al. ............ 718/104 |
| 2005/0027661 A1 | 2/2005 | Lober et al. | |
| 2005/0102121 A1 | 5/2005 | Odhner et al. | |
| 2005/0125401 A1 | 6/2005 | Carr et al. | |
| 2005/0195165 A1 * | 9/2005 | Mitchell ..................... 345/158 |
| 2006/0047813 A1 | 3/2006 | Aggarwal et al. | |
| 2006/0112130 A1 | 5/2006 | Lowson | |
| 2006/0161417 A1 * | 7/2006 | Hardwick et al. ............ 703/22 |
| 2006/0167704 A1 | 7/2006 | Nicholls et al. | |

OTHER PUBLICATIONS

"Marc's Outlook on Productivity: Free Windows Explorer replacement with tabbed UI", at <<http://blogs.officezealot.com/marc/archive/2004/04/07/1803.aspx (1 of 2) [Jan. 8, 2008 5:52:59 PM>>, pp. 1-2.

* cited by examiner

*Primary Examiner*—Thai Phan
(74) *Attorney, Agent, or Firm*—Lee & Hayes, PLLC

(57) ABSTRACT

In an implementation, a system includes a simulation engine that is executable to simulate actions performed by a plurality of devices in a distributed system. The system also includes a plurality of pluggable device models that are accessible by the simulation engine via an interface. Each of the device models represents one of the devices and is configured to map a cost of performing at least one of the actions to an action latency by the corresponding device.

22 Claims, 8 Drawing Sheets

SYSTEMS AND METHODS FOR DEVICE SIMULATION

TECHNICAL FIELD

The present invention generally relates to simulations and more particularly relates to systems and methods for device simulation.

BACKGROUND

The compoundity of devices is ever increasing, and as the compoundity of these devices increase, so generally do the costs in designing and manufacturing the devices. Additionally, these devices may be combined with other devices to form systems having even greater compoundities. For example, devices may be combined to form a distributed system which includes computing devices, network connection devices, applications which are executed on the computing devices, and so on. Therefore, operation of a distributed system may involve a variety of different interactions between the devices which affect the overall functionality of the system.

One technique which may be utilized to determine the suitability of devices and systems to provide desired functionality is through the use of simulations. Simulations may be utilized to test the functionality of devices to perform desired actions without having to actually produce the devices and/or arrange them into the desired distributed system configuration. However, traditional simulation techniques are overly complicated with regard to model development and configuration and result in great inefficiencies, especially when simulating a distributed system.

Therefore, there is a continuing need for improved techniques for device simulation, especially in distributed systems.

SUMMARY

Systems and methods for device simulation are described. In an implementation, a method is described which includes receiving a request by a device model via an interface from a simulation engine to calculate a time to live (TTL) for at least one action to be performed by a device simulated by the simulation engine. The time to live is calculated by the device model for the at least one action based on a current state of the device as simulated by the simulation engine.

In another implementation, a method includes receiving a request by a device model via an interface from a simulation engine to calculate utilization of a device simulated by the simulation engine. The utilization is calculated by the device model based on a current state of the device as simulated by the simulation engine.

In a further implementation, a system is described which includes a simulation engine that is executable to simulate actions performed by a plurality of devices in a distributed system. The system also includes a plurality of pluggable device models that are accessible by the simulation engine via an interface. Each of the device models corresponds to one of the devices and is configured to map a cost of performing at least one of the actions by the corresponding device to an action latency.

BRIEF DESCRIPTION OF THE DRAWINGS

The same reference numbers are utilized in instances in the discussion to reference like structures and components.

DETAILED DESCRIPTION

Overview

Systems and methods are described for device simulation. In an implementation, a system is described which includes a generic simulation infrastructure, which may be referred to as a "simulation engine". The simulation engine is configured to interact with a plurality of pluggable device models, which may be configured to represent various kinds of hardware devices via a universal interface. The system may provide a variety of metrics that describe performance of the system under load, such as though execution of transactions by the devices in the system. For example, the simulation engine may calculate hardware operation latency of a simulated device when the device is experiencing load from multiple parallel transactions. In another example, the latency of operations that involve multiple hardware devices may be calculated. In a further example, device utilization due to applied load may also be calculated. In the following discussion, the terms "duration" and "latency" are utilized interchangeably to describe an amount of time utilized by one or more devices to perform one or more actions.

Exemplary Simulation Systems

Figure 1:
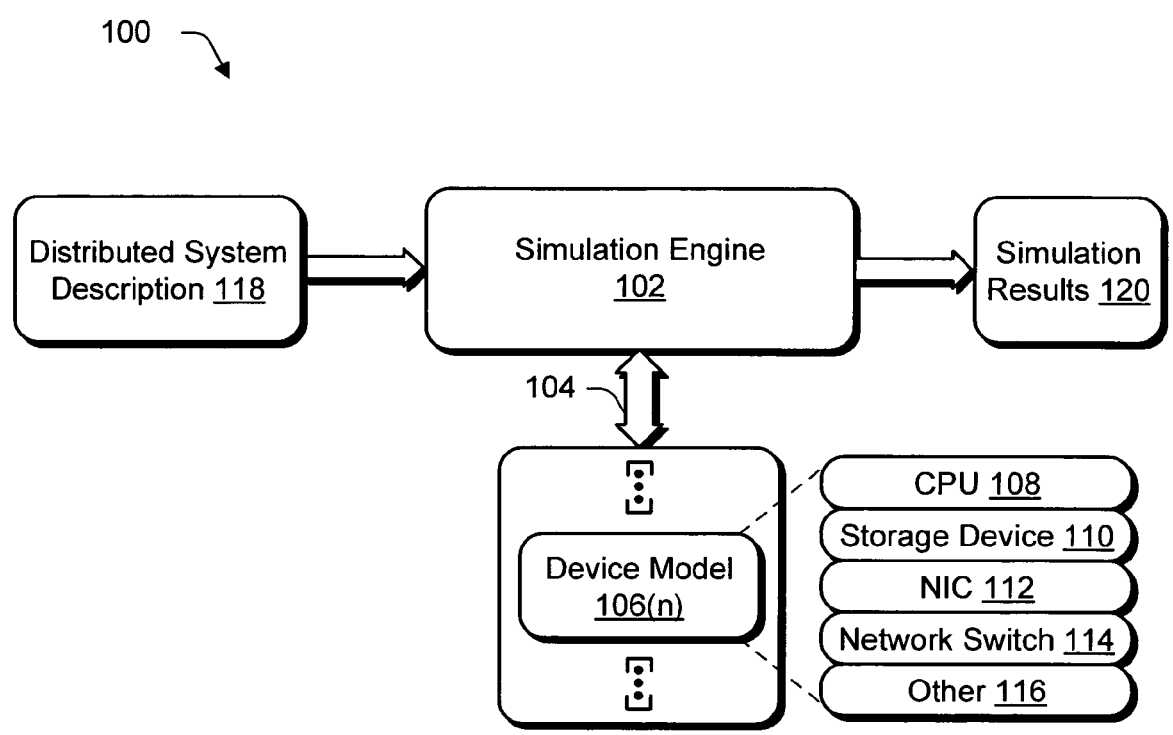
FIG. 1 is an illustration of a system in an exemplary implementation which is operable to perform device simulation.

FIG. 1 is an illustration of a system 100 in an exemplary implementation which is operable to perform device simulation. The system 100 includes a simulation engine 102 that is executable to simulate operation of various devices and collections of devices, such as a distributed computer system. For example, the simulation engine 102, when executed, may simulate the execution of transactions by devices "faster than real time" such that operation of a device over a period of days may be simulated in just a few seconds.

In an implementation, the simulation engine 102 is "generic" such that the simulation engine 102 is not "aware", by itself, of the particulars of any specific device. To obtain device specific information, the simulation engine 102 may be configured to communicate via an interface 104 with a plurality of device models 106(n), where "n" can be any integer from one to "N".

Each of the plurality of device models 106(n) corresponds to a particular device type, such as a central processing unit (CPU) 108, a storage device 110 (e.g., hard disk, removable memory device, and so on), a network interface card (NIC) 112, a network switch 114, or "other" 116 device. For example, the other 116 device may be a future device which does not have a current physical implementation to facilitate accounting for future technological changes in hardware capabilities as part of a capacity planning process. In this implementation, the specifics for each of the devices simulated by the simulation engine 102 are provided by the device models 106(n) in one or more separate modules that may be independently extended. For example, each device model 106(n) may be provided as a separate module such that as new devices are created, a new device model 106(n) may also be created for use by the simulation engine 102. In another implementation, the plurality of device models 106(n) are provided together as a single module that may be updated with new device models, new device configurations (e.g., a set of parameter values for specializing a device model to represent a particular device from a particular manufacturer with particular characteristics), and so on. A variety of other implementations are also contemplated. Thus, extensive rewriting of the simulation engine is not needed to keep the simulation engine 102 "up to date" regarding new device modifications (e.g., a new modification of a storage device), new device models (e.g., a particular storage device from a particular manufacturer), and so on.

The interface 104 (e.g., an application programming interface) between the simulation engine 102 and the device models 106(n) may be implemented in a variety of ways. For example, each of the device models 106(n) may be represented as a class implementing a matching interface, one to another, thereby making differences of the device models 106(n) transparent to the simulation engine 102. Likewise, each of the device models 106(n) may access the simulation engine 102 via an application programming interface that exposes the device state information utilized to calculate device performance statistics, further discussion of which may be found in relation to FIGS. 7 and 8. Conversely, the simulation engine 102 may access the device models 106(n) via an application programming interface that exposes configuration properties of the device model such as service and queuing policies, further discussion of which may be found in relation to FIG. 6. Thus, the interface 104 may include an application programming interface to provide programmatic access between the simulation engine 102 and the device models 106(n).

As previously described, the simulation engine 102, when executed, may compute predictions regarding performance of a device, collections of devices, and so on. For example, the simulation engine 102 is illustrated in the system 100 of FIG. 1 as receiving a distributed system description 118, which describes a distributed computer system executing a set of distributed applications. The distributed system description 118, for instance, may include information about the distributed system topology (e.g., which devices are included in the distributed systems and how those devices are connected, one to another), an application workload definition which describes the "work" to be performed by the distributed system. The workload is specified as transaction frequencies and application model parameterization. The simulation engine 102 is the component of the simulation system that performs calculations which describe operation of the simulated distributed system, such as to predict device utilizations and transaction latencies. The simulation engine 102 may then output simulation results 120 which describe a result of the calculations such that users may assess the system performance and/or evaluate the effects of a change in the system configuration.

To calculate the performance predictions for the distributed system, for instance, the simulation engine 102 may generate thousands of transactions and apply these transactions to the device models 106(n), such as to simulate the effect of multiple transactions which use the same hardware devices simultaneously, i.e., parallel transactions. The device models 106(n) may respond to the applied load by calculating a variety of metrics which may be utilized to described operation of the simulation, such as latencies for each individual hardware operation submitted to the device model 106(n), utilization as a portion of utilized device capacity, and so on, further discussion of which may be found in relation to FIG. 9. In an implementation, the number of interactions with the device models 106(n) by the simulation engine 102 is minimized for efficient execution of the simulation, further discussion of which may be found in relation to FIG. 5.

In this way, the simulation engine 102 may provide a generic simulation infrastructure that accepts pluggable models for various kinds of hardware devices. The simulation engine 102 and the plurality of device models 106(n) may communicate via a universal interface 104 that allows for implementation of models for various types of hardware, allows for fast simulation of transactions that execute simultaneously while taking into account the contention effects of the simultaneous transactions, is flexible such that the device models may use analytical modeling instead of simulation, is simple such that the device models code may be relatively short and cohesive description of device specifics, and so on.

Exemplary Transactions

Figure 2:
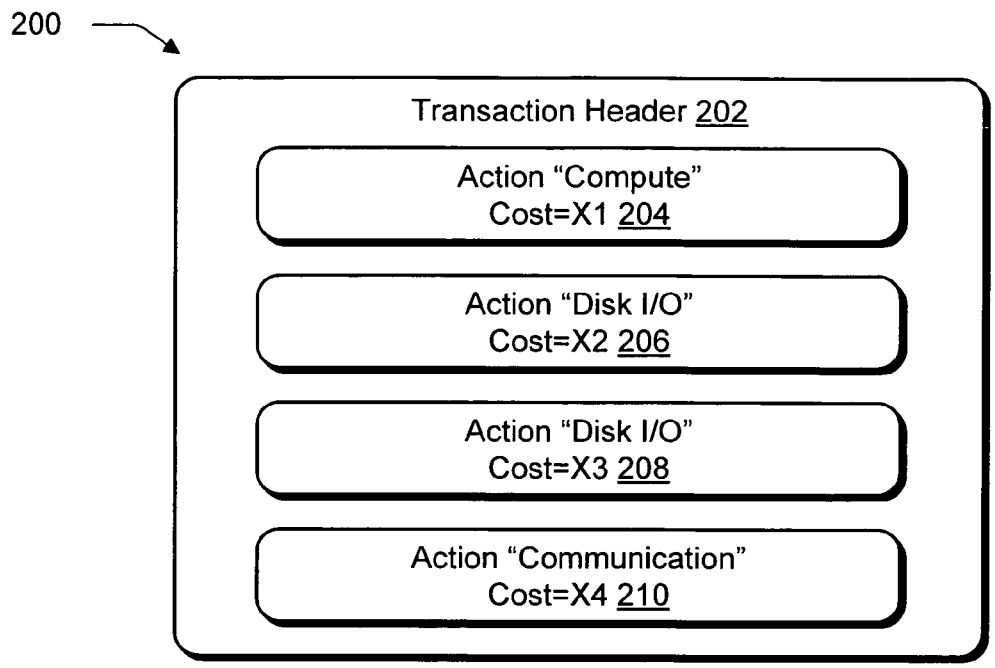
FIG. 2 is an illustration of a transaction in an exemplary implementation which includes a plurality of actions to be performed during a simulation.

FIG. 2 is an illustration of a transaction 200 in an exemplary implementation which includes a plurality of actions to be performed during a simulation. During simulation, the simulation engine 102 may generate transactions using rules defined in application models provided in the distributed system description 118. The transactions represent sequences of hardware operations (i.e., actions) and flow control elements that correspond to a flow of operations executed by the application to perform a procedure. For example, an email application model may generate transactions for such operations as "Send Email", "Open Public Folder", "Logon to Server", and so on. When simulated by the simulation engine 102, each action is associated with a device type and a particular device instance that is assigned to process the action. In an implementation, actions are simulated in a strict sequence prescribed by the transaction flow. Additionally, multiple transactions may be generated to execute over the same period of time, thus a single device can experience load from multiple actions applied at the same and/or overlapping periods of time, further discussion of which may be found in relation to FIG. 3.

The transaction 200 is illustrated as including a transaction header 202 to identify the transaction and a plurality of actions 204-210 which are to be performed to complete the transaction 200. Each action carries load information which has a structure that is specific for the particular action type.

For example, the load specified for the "compute" action 204 may by specified as a number of cycles to be performed by a central processing unit (CPU). The compute action 204 may also reference information about the particular CPU, from which, the measurements were taken. For example, the compute action 204 may reference that the number of cycles were counted for use by a single core processor. This information allows the device model to rescale the action cost to match a particular device configuration to account for architectural differences in the variety of device exemplars in this device type. For a disk input/output (I/O) action 206, the load structure may contain an I/O block size, a total I/O size, a type of operation (e.g., read or write), and so on. The particular values for the load structures are provided by the application model according to the workload parameterization specified in the distributed system description 118, which can include, for instance, a number of users, a frequency of invoking by the application transactions, and so forth. The device model 106(*n*) consumes the load information to calculate action latency, i.e., an amount of time utilized by the simulated device to perform the action. The device model 106(*n*) also consumes the load information to calculate the instantaneous utilization of the device. These performance statistics produced by the device models are then consumed by the simulation engine 102 to calculate performance statistics attributable to actions processed by the device which are typically of interest to the user of the simulation.

Figure 3:
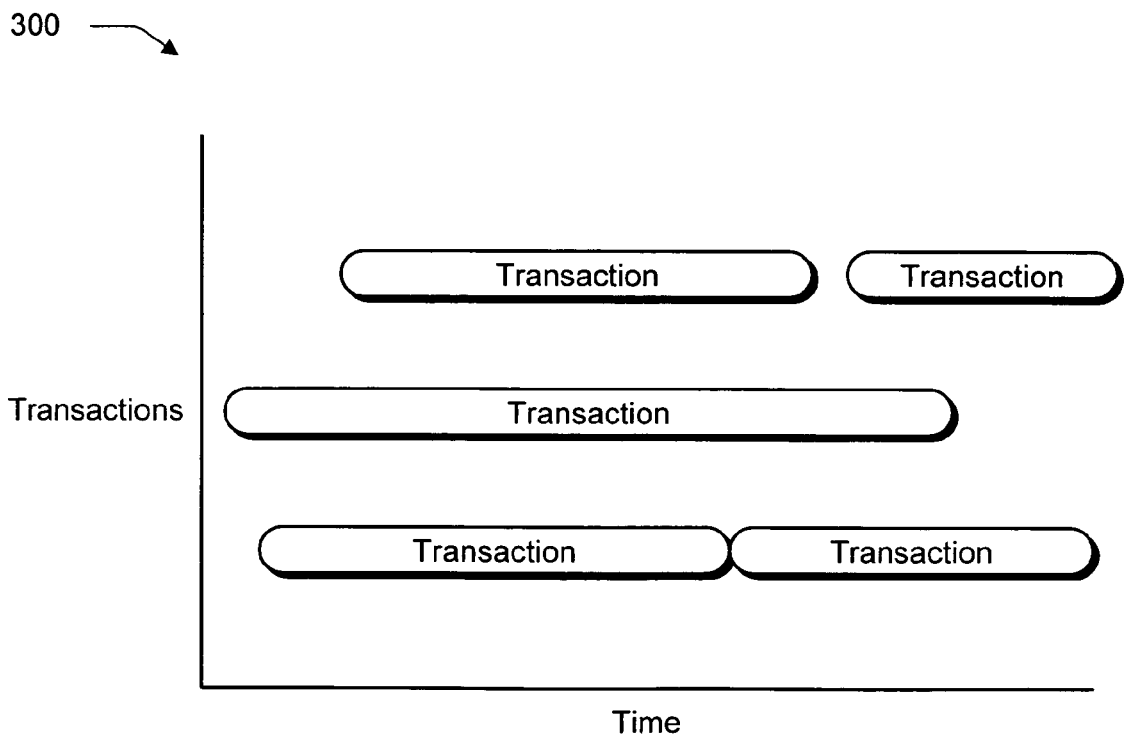
FIG. 3 is an illustration of a graph in an exemplary implementation showing a plurality of transactions that may be performed by a simulated device, at least some of which are performed concurrently.

FIG. 3 is an illustration of a graph 300 in an exemplary implementation showing a plurality of transactions that may be performed by a simulated device, at least some of which are performed concurrently. The graph 300 includes an axis to denote "time" and another axis to denote "transactions". As shown by the graph 300, the device may perform multiple "parallel" transactions, the performance of which may affect how each of the transactions is performed. For instance, multiple read and write actions may affect the amount of time needed to perform each separate action. Accordingly, the device model 106(*n*) may provide information regarding this consideration such that the simulation engine 102 may accurately reflect the performance of parallel transactions, further discussion of which may be found in relation to FIG. 6.

The simulation engine 102 may be configured as a general purpose discrete events simulation system, such that the simulation engine 102 may control the simulation of discrete events over a period of time on simulated devices. The simulated devices, in turn, may manage device state that is subject to change due to newly arriving and completing actions and use the device models to perform operations that are specific for the particular device type. Additionally, the event simulation functionality and the general action sequence control functionality of the simulation engine 102 may be made available to the device models 106(*n*) through the interface 104.

The use of discrete event simulation for predicting device performance is optional and may be specific to the device model implementation. For example, simulated devices that do not require the modeling of contention effects may calculate the action latency without involving the simulation. A network switch working at low utilization zone (e.g., without congestions) is one such example. Other device models may instead require discrete event simulation. Therefore, event objects are created for processing by the simulation engine 102 to simulate the usage of events by the simulated devices. Accordingly, an "action object" which is utilized to describe a particular hardware operation may contain any number of events created by the device models 106(*n*) for simulation.

Figure 4:
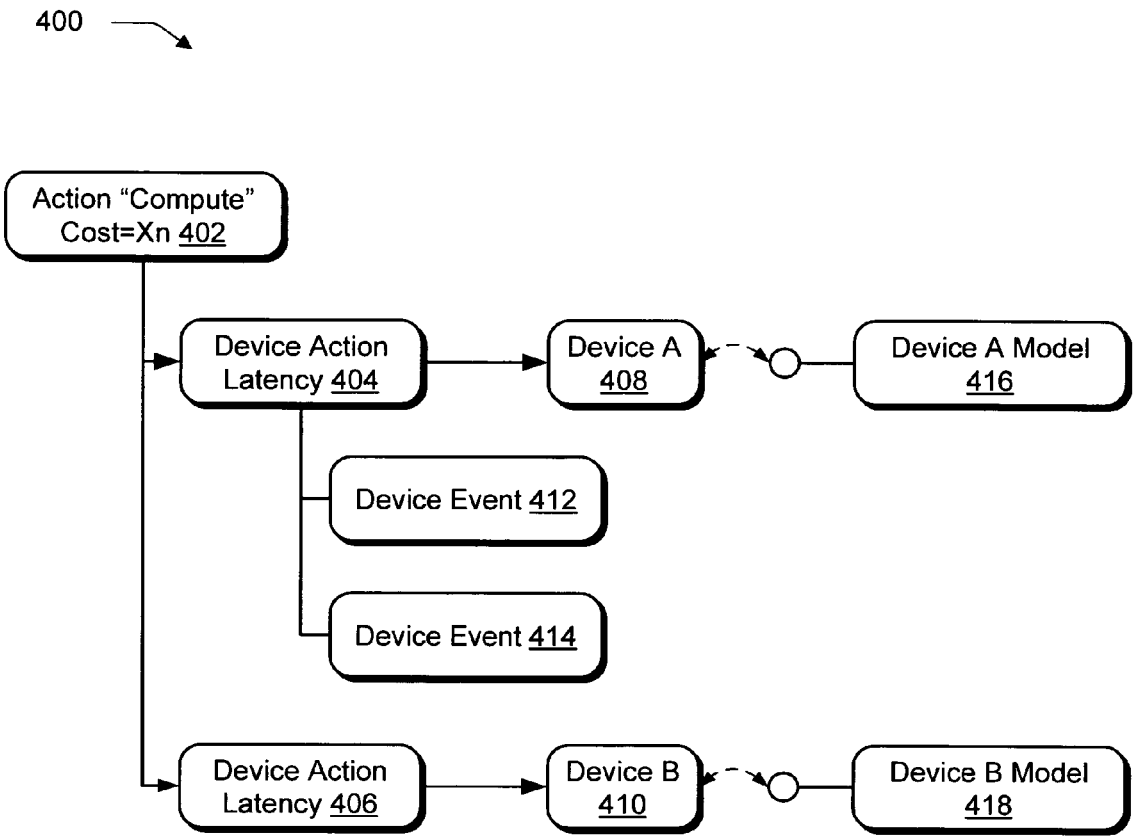
FIG. 4 is an illustration of an action processed by a compound device in an exemplary implementation that includes a plurality of subsidiary actions that, when taken together, form the compound action. Each subsidiary action is associated with one device out of the compound structure.

FIG. 4 is an illustration of a compound action in an exemplary implementation 400 that includes a plurality of subsidiary actions (404, 406) that, when taken together, form the compound action. A compound hardware device may have a structure that includes a plurality of individual devices. Accordingly, an action scheduled for performance by the compound device may be processed by several device models 106(*n*). This may be utilized to provide a wide variety of functionality. For example, a total transaction latency of the simulated compound hardware device may be a function of the effects of the individual devices which form the compound device. To allow such processing, an action object may contain records for each device (404, 406) that contributes to processing an action represented by the action object.

For example, if an action is to be performed by two different devices, an action object 402 which represents this action may contain two instances (e.g., device action latency 404, device action latency 406) of a device action class that are associated with the corresponding device objects (e.g., device A 408, device B 410). Depending on the logic of the device models associated with the contributing devices, the action can contain a number of device events for simulation by the simulation engine 102. For example, device action latency 404 is illustrated as including device events 412, 414. If the device action object does not include events, then a latency calculation is performed analytically. For example, device action latency 406, as illustrated, does not include device events and therefore a calculation of latency for device B 410 is performed analytically.

It should be noted that FIG. 4 also illustrates an exemplary structure for device simulation by the simulation engine 102 and the plurality of device models 106(*n*) of FIG. 1. For instance, the simulation engine 102 in this instance instantiates a device A 408 object and utilizes configuration information obtained from a device A model 416 such that the device A 408 object accurately represents the device. Likewise, the simulation engine 102 instantiates a device B 410 object and configures the object based on configuration information obtained from a device B model 418. In an implementation, the device objects (e.g., device A 408, device B 410) are configured to reflect a particular state in the operation of the simulated device. Therefore, the objects need not communicate with the corresponding device models as long as the state of the simulated device does not change, and therefore communication between the simulation engine 102 and the device models (e.g., device models 106(*n*) of FIG. 1) is minimized. Once a state change occurs, the simulation engine may update the device objects, further discussion of which may be found in relation to FIG. 9.

Figure 5:
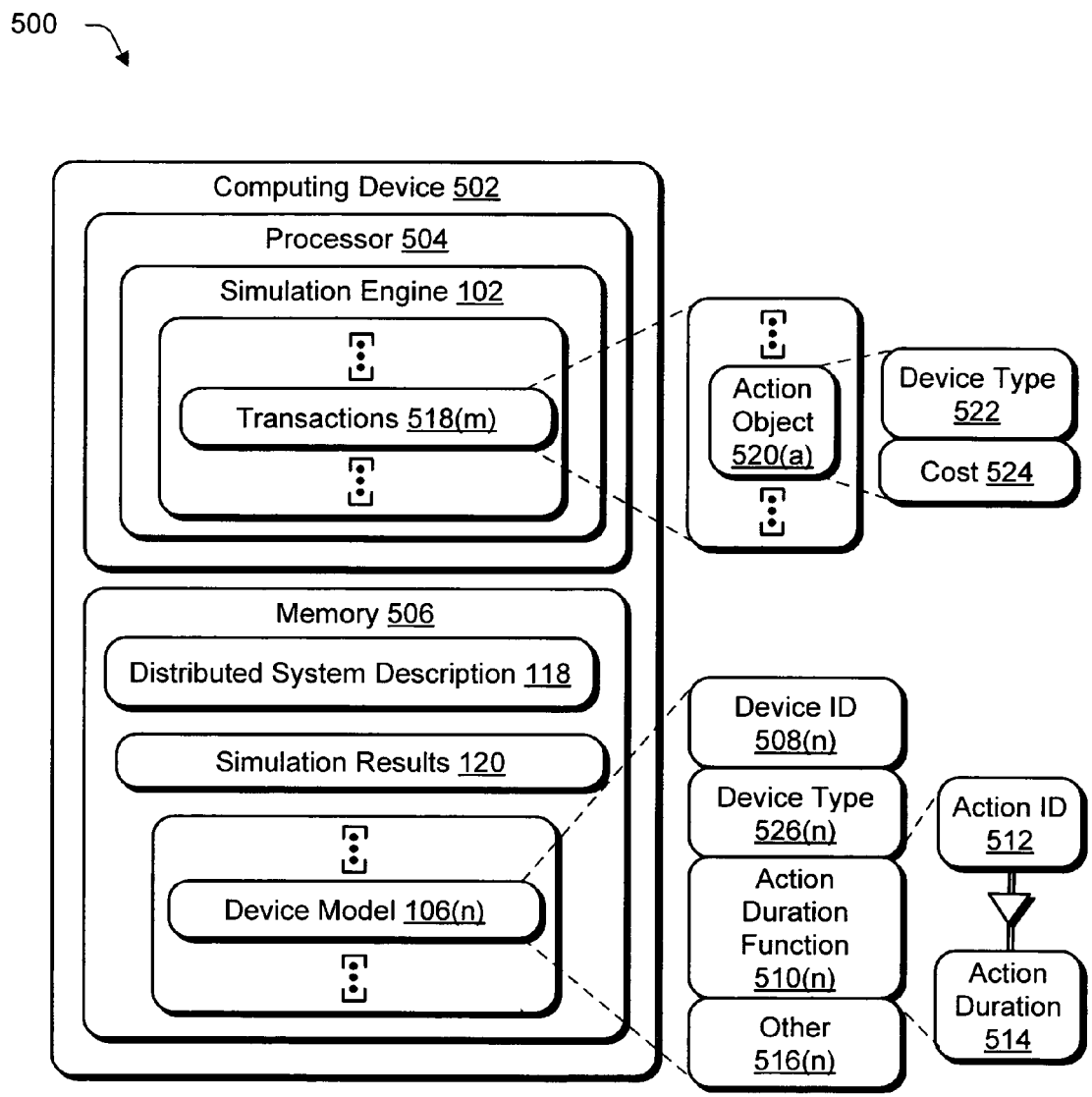
FIG. 5 is an illustration of an environment in which the system of FIG. 1 is executed in a computing device to simulate operation of a distributed system.

FIG. 5 is an illustration of an environment 500 in which the system 100 of FIG. 1 is executed in a computing device 502 to simulate operation of a distributed system. The computing device 502 may be configured in a variety of ways, such as a laptop computer, a desktop personal computer (PC), a server, a minicomputer, and so on. Additionally, although a single computing device 502 is shown, the computing device 502 may be representative of a plurality of computing devices which are operable to execute the system 100 of FIG. 1, such as a server "cluster" or "farm". A variety of other implementations are also contemplated.

The computing device 502 is illustrated as including a processor 504 and memory 506. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 506 is shown, a wide variety of types and combinations of memory may be employed, such as random access memory (RAM), hard disk memory, removable medium memory, and so forth.

The computing device 502 is illustrated as executing the simulation engine 102 on the processor 504, which is also storable in memory 506. As previously described, the simulation engine 102 is executable to simulate operation of a plurality of devices. For example, the simulation engine 102 may examine a distributed system description 118 to determine which devices are to be simulated and how the devices are to be connected. The simulation engine 102 may then locate which of the plurality of device models 106($n$) correspond to the devices which are to be simulated. For example, each device model 106($n$) may have a device identifier (ID) 508($n$) which corresponds to a particular device type 526($n$), such as hard drive, network interface card, central processing unit, and so on. Additionally, the device identifier 508($n$) may specify a particular model of the device type, such as a particular processor manufactured by a particular manufacturer. A variety of other examples are also contemplated.

Each device model 106($n$) is also illustrated in FIG. 5 as having an action duration function 510($n$). The action duration function 510($n$) is utilized by the device model 106($n$) to map a cost of performing an action into units of time. For example, the action duration function 510($n$) may accept an action ID 512 which identifies a particular action to be performed by the device model 106($n$). The action ID can be accepted because the device type 522 specified by the action object 520 matches the device type 526($n$) implemented by the device model. The action ID then allows the device model 106($n$) to determine the action costs and perform the calculation of the action duration 514. In this way, the action duration function 510($n$) may be applied to a plurality of actions that may be performed by the simulated device which corresponds to the device model 106($n$). For example, a device model that has the device type "central processor unit" can accept each action marked with this device type.

The device model 106($n$) may support the ability to execute concurrent actions. However, the execution of the concurrent actions may affect the amount of time needed to perform each action, i.e., the duration of each action. Accordingly, an action ID and action duration may be specified for an instance in which a single action is performed and another action ID and action duration may be specified for another instance in which two actions are performed concurrently, and so on.

Further, as previously described, the mapping performed by the device model 106($n$), and more particularly the action duration function 510($n$), may accept inputs which reflect the type of device being simulated. For example, an action duration function for a processor may internally use a number of cycles which may be performed in a unit of time. An action duration function for a storage device may map a number of bytes having a particular block size which may be read per unit of time, a number of bytes having a particular block size which may be written per unit of time, and so on. An action duration function for a network access card may specify an amount of time required to communicate a specific number of bytes. A variety of other examples are also contemplated.

The device model 106($n$) may also specify a variety of "other" 516($n$) information for the device model 106($n$). For example, the device model 106($n$) may indicate that "x" number of concurrent transactions are supported, a queue size for queuing transactions, and so forth. Thus, this "other" 516($n$) information may also be particular to the device and thereby enable the simulation engine 102 to accurately simulate operation of the device.

The simulation engine 102 is also executable that simulates a plurality of transactions 518($m$), where "m" can be any integer from one to "M", which may be performed in the simulation. For example, the distributed system description 118 may describe which actions are to be performed in the simulated system by providing an application model. The application model may describe an order for performing a plurality of transactions and which actions are included in the transactions. In another example, the simulation engine 102 may provide a user interface, in which, a user may specify particular transactions to be performed in the simulated system. A variety of other techniques may also be utilized to specify transactions which are to be performed in the simulated system.

Each of the transactions 518($m$) is illustrated as including a plurality of action objects 520($a$), where "a" can be any integer from one to "A. Each action object 520($a$) represents an atomic operation that is to be performed by a corresponding simulated device. Accordingly, each action object 520($a$) defines a cost 524 for determining duration for performing the represented action by a simulated device. For example, the simulation engine 102 compares the device type 522 of the action object 520($a$) with the plurality of device types 508($n$) of the device models 106($n$) to determine which subset of available device models is to consider for performing the action. The simulation engine 102 selects a single device 508 for performing this particular action by using a scheduling algorithm prescribed by the application model that is defined in the system description 118. The simulation engine 102 may then pass the cost 524 of performing the action to the device model 106($n$) to have the device model 106($n$) map the cost 524 of the action, using the action duration function 510($n$), to the action duration 514. For example, the cost 524 may be specified as "100 kilobytes" and the action duration function 510($n$) may map this cost using the action duration function 510($n$) which indicates that the simulated device takes "0.3 seconds" to communicate 100 kilobytes. Further discussion of interaction between the simulation engine 102 and the device models 106($n$) may be found in relation to FIGS. 6-9.

Generally, any of the functions described herein can be implemented using software, firmware (e.g., fixed logic circuitry), manual processing, or a combination of these implementations. The terms "module" and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, such as the memory 506 of the computing device 502. The features of the simulation techniques as described herein are platform-independent, meaning that the techniques may be implemented on a variety of commercial computing platforms having a variety of processors.

Exemplary Procedures

The following discussion describes simulation techniques that may be implemented utilizing the previously described systems and devices. Aspects of each of the procedures may be implemented in hardware, firmware, or software, or a combination thereof. The procedures are shown as a set of blocks (e.g., FIGS. 6-8) or arrows (e.g., FIG. 9) that specify operations performed by one or more devices and are not necessarily limited to the orders shown for performing the operations by the respective blocks. In portions of the following discussion, reference will be made to the systems and environments described in relation to FIGS. 1-5.

Figure 6:
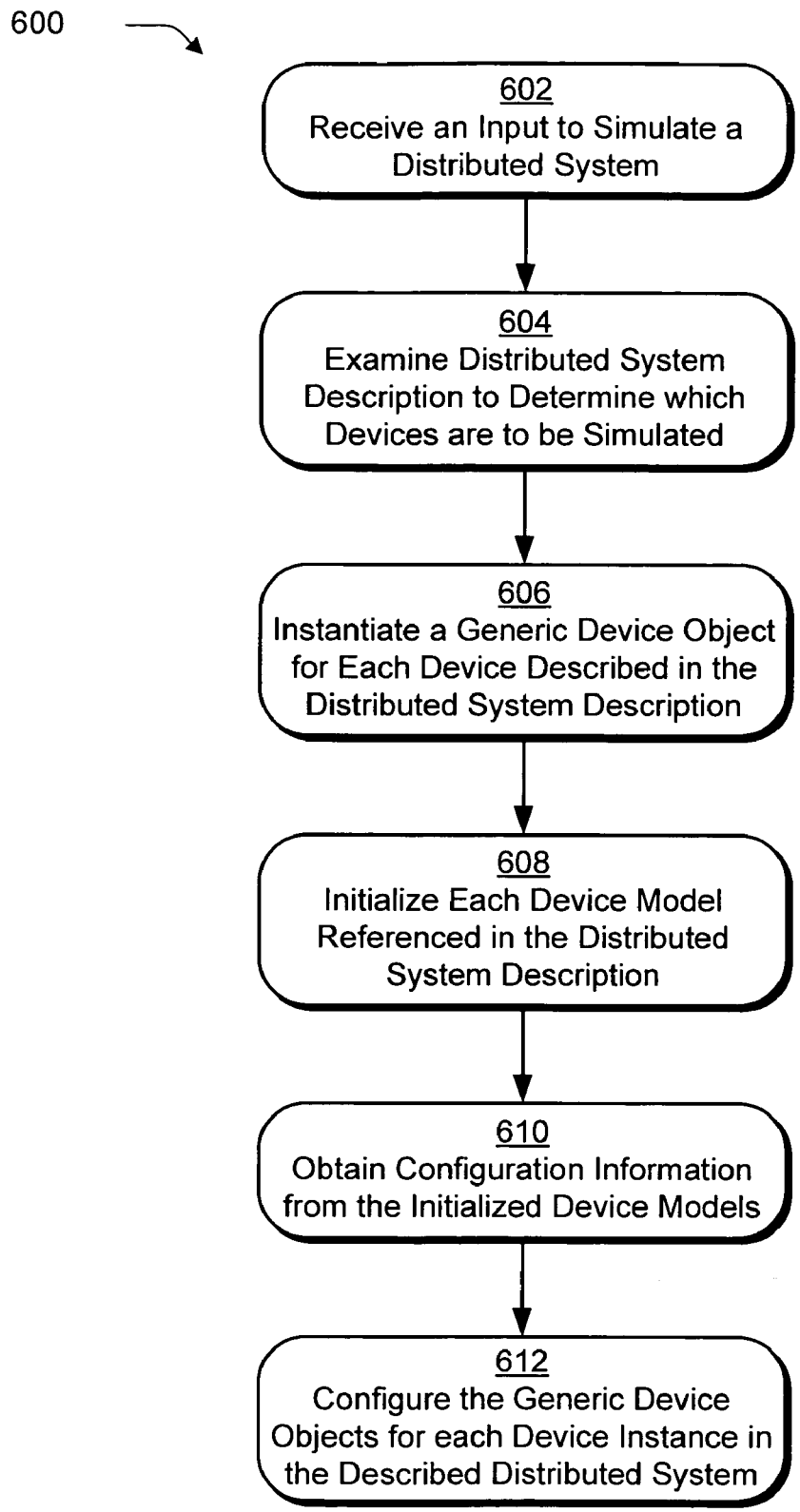
FIG. 6 is a flow diagram depicting a procedure in an exemplary implementation in which a simulation is initialized for simulating a distributed system.

FIG. 6 is a flow diagram depicting a procedure 600 in an exemplary implementation in which a simulation is initialized for simulating a distributed system. The simulation engine 102 receives an input to simulate a distributed system (block 602). For example, the simulation engine 102, when executed, may receive the distributed system description 118.

The simulation engine 102 is executed to examine the distributed system description to determine which devices are included in the distributed system (block 604). For example, the distributed system description may describe which devices are to be simulated in the system, a device type (e.g., storage device, network connection device, and so on) for each device, a device model (e.g., a particular model from a particular manufacturer) for each device, a device configuration (e.g. model parameters describing a particular device instance) for each device, how the devices are to be communicatively coupled, and so on.

The simulation engine then instantiates a generic device object for each device described in the distributed system description (block 606). For example, the generic device object may be representative of any device that is to be simulated in the distributed system. In another example, a plurality of generic device objects are provided, each having a particular device type, such as storage device, central processing unit, network interface card, and so on. A variety of other examples are also contemplated.

The simulation engine also initializes each device model referenced in the distributed system description (block 608). For example, from the examination of the distributed system description (block 604), the simulation engine 102 may determine a device type, device model, and model configuration for each device to be simulated, such as through use of a device ID as described in relation to FIG. 5. The simulation engine 102 may then use this information to locate a corresponding one of the plurality of device models 106(n) which is configured to model the referenced device and initialize the located device model.

The simulation engine 102 then obtains device runtime parameterization information from the initialized device models (block 610). For example, the simulation engine may communicate with the initialized device models via one or more application programming interfaces exposed by the device models to obtain the configuration information. As previously described, the application programming interfaces may be "standardized" such that the simulation engine 102 does not need to be specially configured to interact with each of the plurality of device models 106(n). For example, each device model 106(n) may support a plurality of method calls which return configuration information that is specific to the device model 106(n), such as "Get Event Service Policy" to determine the maximum number of available event executing slots and event servicing policy (e.g., single resource, shared resource, number of shared resources, and so on) supported by the device model 106(n), "Get Event Queuing Policy" to determine the maximum number of available event queues and event queuing policy (e.g., round robin, random, sequential, and so on) supported by the device model 106(n), and so on. Thus, the device models 106(n) are responsible for informing the simulation engine 102 what configuration it should use for event servicing and queuing disciplines. The device model 106(n), for instance, may provide such configuration information as a number of service slots for simultaneously executing events (which limits the maximum contention index of the device), a number of event queues, a maximum queue length, and so on.

Once the configuration information is received, the simulation engine configures the generic device objects for each device instance in the described distributed system (block 612). Once configured, each of the generic device objects is prepared to simulate a corresponding device referenced in the distributed system description. Thus, at this point the simulation engine is ready to simulate the distributed system, further discussion of which may be found in relation to the following figures.

Figure 7:
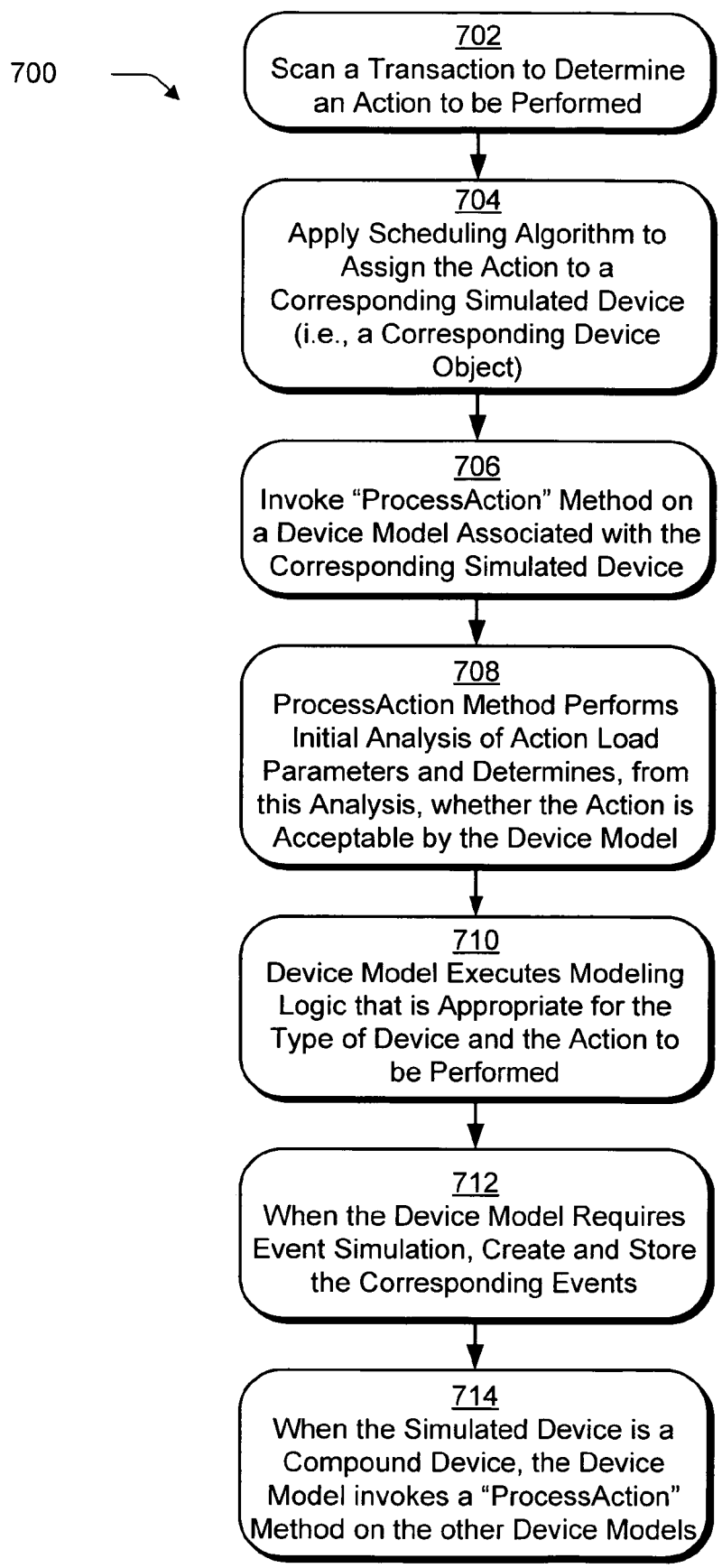
FIG. 7 is a flow diagram depicting a procedure in an exemplary implementation in which a simulation engine initializes and executes actions to be performed in the simulated system initialized by the procedure of FIG. 6.

FIG. 7 is a flow diagram depicting a procedure 700 in an exemplary implementation in which the simulation engine initializes and executes actions to be performed in the simulated system initialized by the procedure 600 of FIG. 6. The simulation engine scans a transaction to determine an action to be performed (block 702) by the simulated system. For example, the simulation engine 102 may scan the transaction 200 of FIG. 2 and determine that action 204 is the first action to be performed. The simulation engine 102 then assigns the action to be performed by a corresponding simulated device by applying a scheduling algorithm (block 704). As previously described, for instance; the action object may specify a particular device type that is to perform the action. Accordingly, the simulation engine 102 may use this information to locate the particular device object which is configured to simulate the device and schedule the action to be performed by the simulated device, i.e., the device object.

The simulation engine then invokes a "ProcessAction" method on a device model associated with the corresponding simulated device (block 706). The "ProcessAction" method, when invoked, performs an initial analysis of the action load parameters and determines, from the analysis, whether the action is acceptable by the device model (block 708), i.e., whether the action is performable by the corresponding device model.

When the action is acceptable, the device model executes the modeling logic that is appropriate for the type of device and the action to be performed block 710). For example, the device model may determine which of a plurality of actions that are performable by the device model correspond to the action received via the interface from the simulation engine 102. When the device model requires event simulation, corresponding events are created and stored to event storage block 712) of the device model.

When the simulated device is a compound device or the action simulation should involve multiple device objects, the device model invokes a "ProcessAction" method on other device models (block 714) that should process this action. To distinguish the simulated devices which contribute to the action processing, the device model assigns different roles to the simulated devices that are managed by other devices, further discussion of which may be found in relation to FIG. 9.

Figure 8:
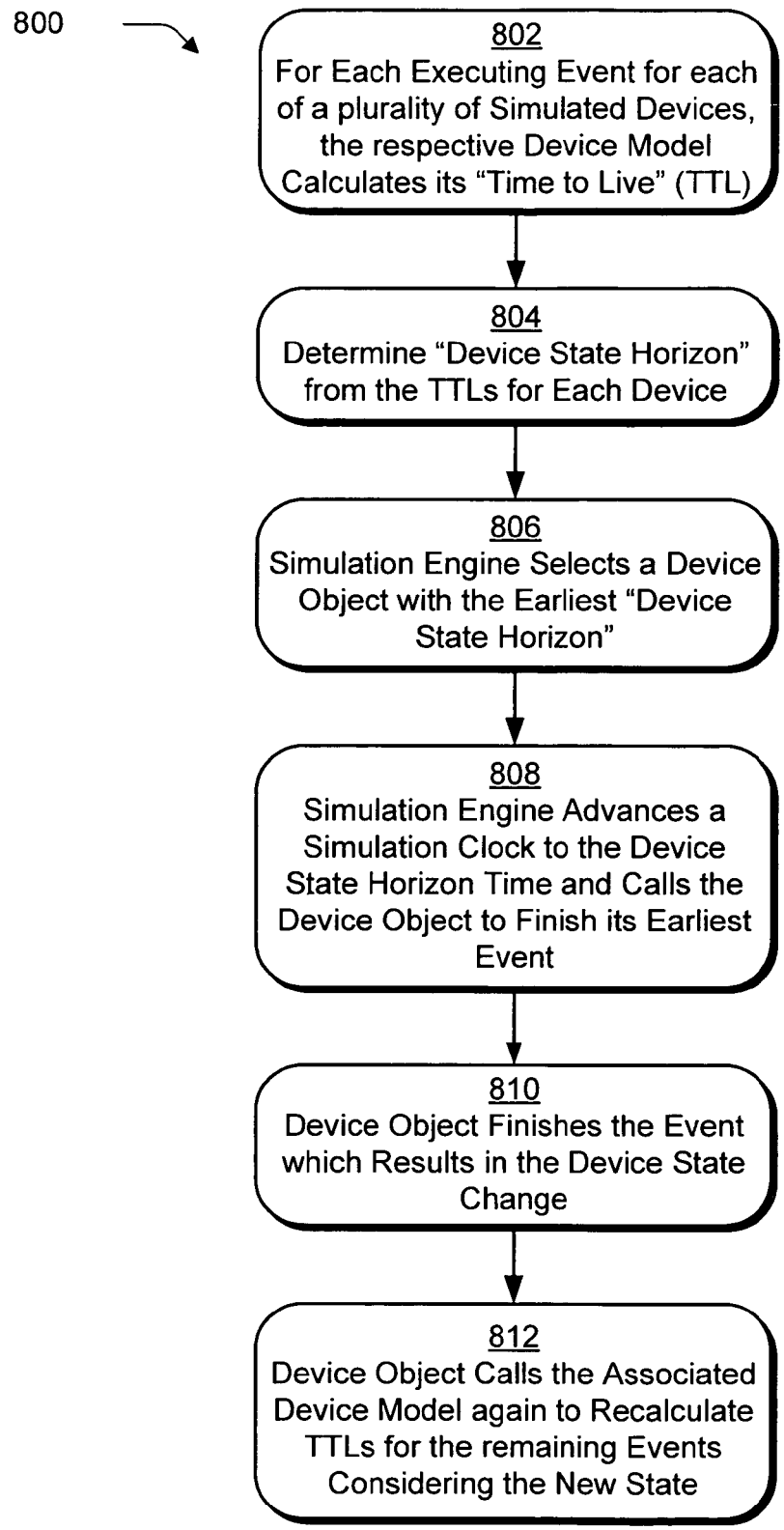
FIG. 8 is a flow diagram depicting a procedure in an exemplary implementation in which a simulation engine performs a simulation step of a simulated device whenever a state change for the simulated device is encountered by interacting with a device model corresponding to the simulated device.

FIG. 8 is a flow diagram depicting a procedure 800 in an exemplary implementation in which a simulation engine performs a single simulation step that includes encountering a device state change for the simulated device by interacting with a device model corresponding to the simulated device. Each device simulated by the simulation engine 102 (i.e., a device object) maintains a predicted point in time, at which, the device state is expected to change. The device state is mainly a function of the number of events currently allocated on the simulated device and the workload carried by the events that is remained to be processed. Therefore, the estimated device state change time is the time, at which, one or more events expire. The estimated device state change time is also referred to as the "device state horizon". One example of computing the device state horizon is discussed in the following paragraphs.

For every executing event, the device model calculates its "time to live" (block 802). The "time to live" describes the duration of the executing event and may depend on a plurality of factors. These factors may include the amount of workload that remains for processing by this event, the current state of the simulated device, the device configuration parameters provided by the system description 118, and so on.

The "device state horizon" (i.e., the estimated device state change time) is then determined from the TTLs (block 804) for each simulated device. The minimum TTL among all executing events on the simulated device is the device state horizon for that device. For example, if a simulated device is executing three events: "e1", "e2", and "e3", and the device model calculates the TTLs for these events as "1", "5", and "3" milliseconds, respectively, the device state horizon for the simulated device is one millisecond, which corresponds to TTL of the event "e1"

The simulation engine then selects the device object having the earliest device state horizon (block 806), advances a simulation clock to this horizon time, and calls the device object to finish its earliest event (block 808). In response to the call, the device object finishes the event which results in the device state change (block 810). Then, the device object calls the associated device model again to recalculate TTLs for the remaining events considering the new state (block 812). Therefore, the event "time to live" calculations may occur at each device state change.

The device models can utilize a variety of different techniques to calculate the event TTL. For example, a device model may determine a workload which was processed since the last evaluation and subtract it from the remaining event workload. The device model may then calculate the TTL using the device processing speed that should reflect the current device state and the device configuration.

The device state can also change if a new action arrives before the estimated state horizon. Therefore, if a new action is scheduled to a device object before the state horizon time the simulated device may update the state and invoke the device model to recalculate the TTLs for all executing events and update the device state horizon.

It should be noted that the previously described protocol of calculating event latencies (i.e., TTL) invokes a single method of the device model which may be referred to as follows:

UpdateEventTimeToLive(Event, OldDeviceState, NewDeviceState, change time)

This method is invoked at each device state change time, i.e., device state horizon. The "UpdateEventTimeToLive" method accepts as an input the "old" and "new" device state and the event that is to be re-evaluated. In an implementation, this method updates an "Event.TimeToLive" property according to the internal device model specific logic. This method enables the simulation engine to simulate parallel transactions as previously described in relation to FIG. 3. Further discussion of the interaction of the simulation engine 102 with a device model using the "UpdateEventTimeToLive" method may be found in relation to the following figure.

Figure 9:
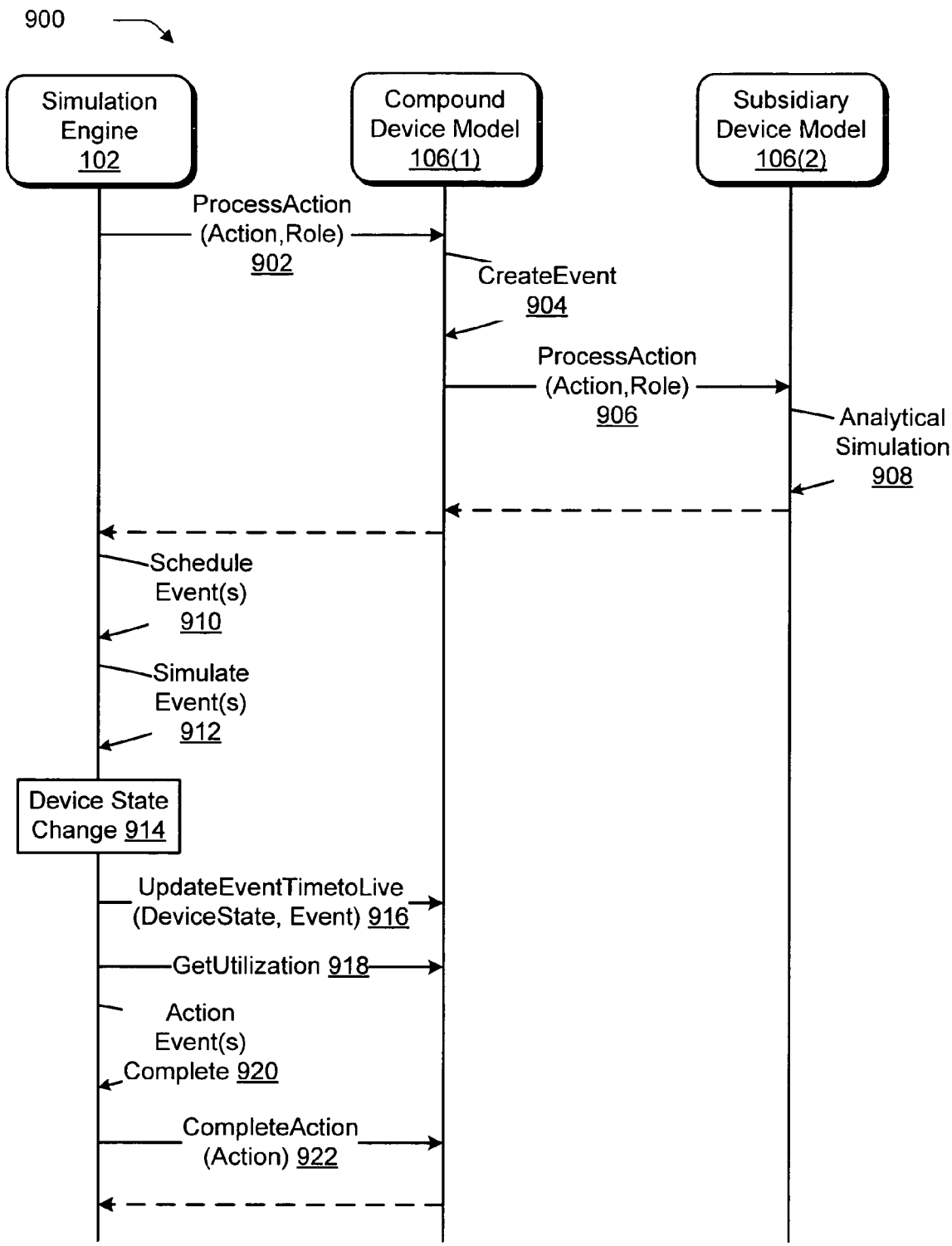
FIG. 9 is an illustration of an exemplary implementation showing a sequence diagram which illustrates interaction between the simulation engine and a compound device.

FIG. 9 is an illustration of an exemplary implementation showing a sequence diagram 900 which illustrates interaction between the simulation engine and a compound device. The sequence diagram 900 depicts a compound device model 106(1) in which the compound device model 106(1) has a "master" role and the subsidiary device model has a "subsidiary" role. The subsidiary device model 106(2) executes logic in the same "ProcessAction" method which however may be implemented by another device model. This thereby permits construction of arbitrary compound devices. Once the action is accepted by the models, the simulation engine 102 analyzes the action and allocates the events to the device event queues if any events were created, an example of which may be found in relation to the description of the sequence diagram 900 as follows.

The simulation engine 102 calls the method "ProcessAction" of the compound device model 106(1) (arrow 902). As previously described, the "ProcessAction" method, when invoked, performs an initial analysis of the action parameters such as the action type, action cost, and determines, from the analysis, whether the action is acceptable by the compound device model 106(1). In the illustrated instance, the action to be simulated requires event simulation, and therefore the compound device model 106(1) creates and stores events to event storage (i.e., queue and event slots) (arrow 904) of the compound device model (arrow 904).

As illustrated, the compound device model 106(1) has a subsidiary device model 106(2) which simulates a component of the compound device. Therefore, the compound device model 106(1) invokes a "ProcessAction" method on the subsidiary device model 106(2) to process the action (arrow 906). The subsidiary device model 106(2) in the illustrated implementation is not configured to utilize events to simulate device performance, but rather performs an analytical calculation of the action latency (arrow 908). The results of the action processing are returned to the compound device model 106(1), which returns the results to the simulation engine 102, which is illustrated by the dashed arrows in FIG. 9.

The simulation engine then schedules and simulates the events created by the device model (arrows 910, 912) without further interaction with the compound or subsidiary device models 106(1), 106(2) until a device state change is encountered (block 914). Thus, communication between the simulation engine 102 and the device models is minimized, thereby conserving resources and enabling the simulation to be performed in a more efficient manner.

Once a device state changes (block 914), the simulation engine 102 communicates with the devices models to obtain information utilizes to update the devices object to accurately reflect the new state. For example, as previously described in relation to FIG. 8, the simulation engine 902 may invoke the method "UpdateEventTimeToLive" of the compound device model 106(1) (arrow 916). The "UpdateEventTimeToLive" method accepts as an input the "old" and "new" device states and the event that is to be re-evaluated. The result of this call includes information which is suitable to configure the device object for the changed state.

The simulation engine also calls a "GetUtilization" method of the compound device model (arrow 918). Device utilization is a metric that reflects a portion of effective device capacity being utilized by the current load. The principles for calculating the device utilization can be specific to the particular kind of hardware device. For example, a compound device (e.g., a processor) that includes multiple cores may process several parallel transactions at the same time and still not be fully utilized, which means that the capacity for the compound device can accept additional load without significantly affecting the currently processed transactions. Therefore the device model (e.g., compound device 106(1) is responsible for calculating the device utilization metric. For example, a device model interface of the compound device model 106(1) may implement a "ComputeUtilization(DeviceState)" method that, when invoked, maps a current device state to a commonly understood metric of device utilization. This method is callable by the simulation engine 102 each time the device state changes, so that a statistical processor in the simulation engine 102 may properly compute average device utilization over time.

When simulation of all events generated for the action is completed (arrow 920), the simulation engine invokes another device model interface method, called "CompleteAction(action)" and passes the completed action (arrow 922). The "CompleteAction" method is callable to calculate the total action latency considering the effects of the action processing by all other contributing devices and the internal device model logic, a result of which is passed back to the simulation engine 102 as illustrated by the dashed arrow.

Thus, the simulation system may support a variety of configuration methods for use over the device model interface, examples of which are repeated in the following table.

Configuration Methods

| Method Name | Parameters | Purpose | When called |
| --- | --- | --- | --- |
| Get Event Service Policy | None | Informs simulation engine of the number of event executing slots and the event servicing policy - shared device, number of shared resources, etc. | Initialization |
| Get Event Queuing Policy[1] | None | Informs simulation engine of the number of event queues and the queuing policy - round robin, random, sequential, etc. | Initialization |
| Get Device Type | None | Reports the type of the device implemented by the device model, the list of device types is fixed in the simulation engine 102 and used for result reporting purposes only (does not affect simulation). | Initialization |
| ProcessAction | Action, DeviceRole | Generates simulation device events for the action. Invokes ProcessAction for subsidiary devices. | Start of action simulation |
| UpdateEventTimeToLive | Device event, Old device state, New device state, Change time | Computes the processed workload since the last calculation with the old device state; Estimates the event time to live with the new device state | Every device state change |
| CompleteAction | Action | Computes total action latency as a function of the latencies of devices that processed this action | End of action simulation |
| ComputeUtilization | Device state | Computes utilization as the portion of utilized device capacity | Every device state change |

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:
1. A method comprising:
   calling, by a simulation engine via a common application programming interface, a first method call that requests configuration information that is specific to a pluggable device model, wherein there are a plurality of method calls supported by the pluggable device model;

receiving, by the simulation engine via the common application programming interface, the configuration information specific to the pluggable device model;

configuring, by the simulation engine, at least one device object based on the configuration information received from the pluggable device model;

requesting, by a second method call from the simulation engine via the common application programming interface, that the pluggable device model calculate a time to live (TTL) for at least one action to be performed by a device simulated by the simulation engine; and receiving, by the simulation engine, the calculated time to live from the pluggable device model for the at least one action based on a current state of the device as simulated by the simulation engine.

2. A method as described in claim 1, wherein the simulation engine is configured to simulate a distributed system having a plurality of devices, at least two of which are communicatively coupled, one to another, over a network.

3. A method as described in claim 1, wherein the pluggable device model is configured to model parallel execution of a plurality of actions.

4. A method as described in claim 1, wherein:
the pluggable device model is one of a plurality of pluggable device models that are accessible by the simulation engine based on a device identifier; and
each pluggable device model has corresponding configuration properties comprising service and queuing policies.

5. A method as described in claim 1, wherein the pluggable device model is a compound device model having at least one subsidiary device model which corresponds to a component of the simulated device;
communicating by the compound device model with the at least one subsidiary device model via the common application programming interface, wherein the communicating facilitates the compound device model to invoke at least one of a plurality of methods on the at least one subsidiary device model to assist in the calculation of the TTL.

6. A method as described in claim 1, further comprising:
communicating the calculated time to live for at least one action from the pluggable device model to the simulation engine;
determining a device state horizon from a minimum time to live (TTL) for a plurality of said calculated times for a plurality of simulated devices; and
maintaining, by the simulation engine, the state of at least one of the plurality of simulated devices.

7. A method as described in claim 6, further comprising:
calling the pluggable device model having the determined device state horizon by the simulation engine to complete execution of an action; and
calling the pluggable device model having the determined device state horizon by the simulation engine once execution of the action is completed to recalculate a time to live for one or more other actions.

8. A method as described in claim 7, wherein the action is one of a plurality of actions which are performed to complete a transaction and further comprising calculating a time to live for the transaction based on a time to live for each of the plurality of actions.

9. A method as described in claim 1, wherein the pluggable device model is configured to model serial execution of a plurality of actions.

10. A method as described in claim 1, wherein the pluggable device model is configured to model both serial and parallel execution of a plurality of actions.

11. A method for a simulation engine to simulate actions performed by a device in a distributed system, the method comprising:
calling, by the simulation engine, at least one of a plurality of methods supported by a compound device model via a common application programming interface to obtain information that is specific to the compound device model, wherein the compound device model comprises at least one subsidiary device model;
invoking, by the compound device model, at least one of a plurality of methods on the at least one subsidiary device model based on at least one of the actions;
receiving a request by the compound device model via the common application programming interface from the simulation engine to calculate utilization of the device simulated by the simulation engine; and
calculating the utilization by the compound device model based on a current state of the device as simulated by the simulation engine, wherein the calculation of the utilization is facilitated by logic encoded in the compound device model and logic encoded in the at least one subsidiary device model.

12. A method as described in claim 11, wherein the utilization reflects a portion of effective capacity of the simulated device being utilized in the current state of the device.

13. A method as described in claim 11, wherein:
the utilization reflects a portion of effective capacity of the compound device model.

14. A system comprising:
a simulation engine that is executable to simulate actions performed by a plurality of devices in a distributed system, wherein the simulation engine provides a generic simulation infrastructure for the plurality of devices, the generic simulation infrastructure comprising:
a simulation engine application program interface; and
a common device model application program interface;
a plurality of pluggable device models that are accessible by the simulation engine via the common device model application program interface, wherein each said device model:
represents a corresponding said device;
maps a cost of performing at least one of the actions by the corresponding said device to an action latency by employing device specific logic embedded in the device model; and
supports a plurality of method calls invoke-able by the simulation engine via the common device model application program interface, the method calls providing capabilities comprising:
requesting configuration information that is specific to the device model, wherein the configuration information is used by the simulation engine to configure corresponding simulation services;
assigning the at least one of the actions to the device model; and
obtaining information related to the at least one of the actions; and
accesses the simulation engine via the simulation engine application program interface to expose device state information utilized to calculate device performance statistics.

15. A system as described in claim 14, wherein one or more said pluggable device models are identifiable by a device identifier.

16. A system as described in claim 14, wherein at least one said device model is a compound device model having at least one subsidiary device model which corresponds to a component of a corresponding said device simulated by the at least one said device model, wherein the compound device model invokes at least one of a plurality of methods on the at least one subsidiary device model based on the at least one of the actions.

17. A system as described in claim 14, wherein at least some of the actions, when combined, describe a transaction that is performable by the distributed system.

18. A system as described in claim 14, wherein the distributed system includes a plurality of computing devices which are communicatively coupled, one to another, via a network.

19. A system as described in claim 14, wherein at least one said device model is configured to:

receive a request via the interface from the simulation engine to calculate utilization of a corresponding said device simulated by the simulation engine; and calculate the utilization based on a current state of the corresponding said device as simulated by the simulation engine.

20. A system as described in claim 14, wherein at least one said device model is configured to:

receive a request via the interface from the simulation engine to calculate a time to live (TTL) for a simulation event; and calculate the time to live for at least one said event to be performed by a simulated device based on a current state of the simulated device as simulated by the simulation engine.

21. A system as described in claim 14, wherein the request is sent by the simulation engine each time a device state changes occurs for at least one said simulated device.

22. A system as described in claim 14, wherein the request is not sent by the simulation engine when a device state change does not occur.

* * * * *